Patented Nov. 25, 1947

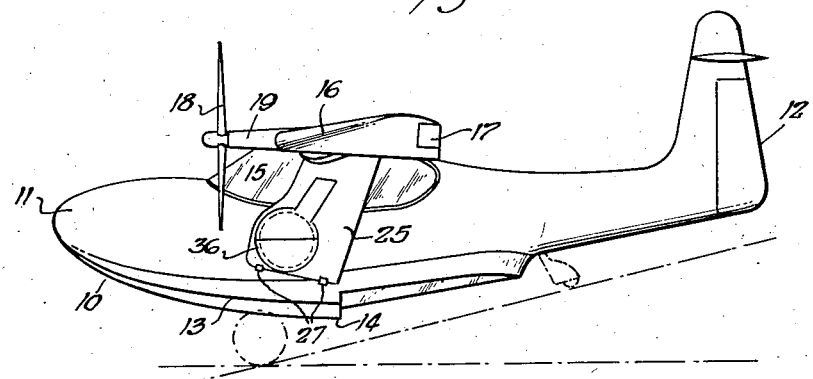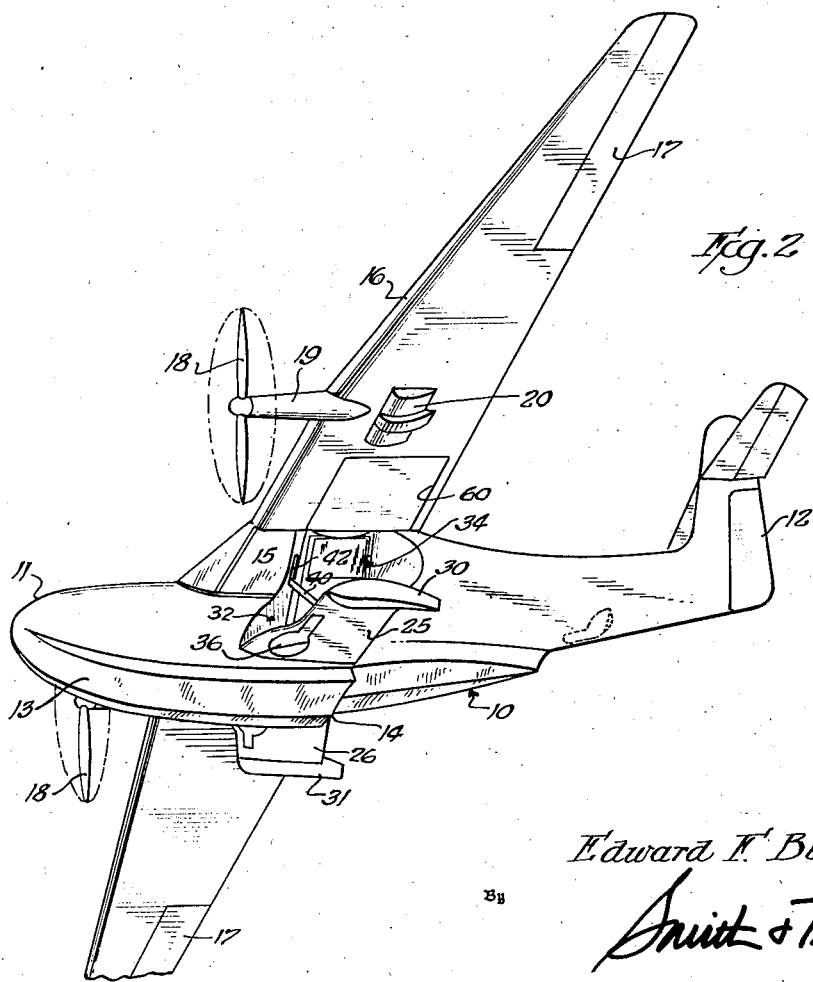

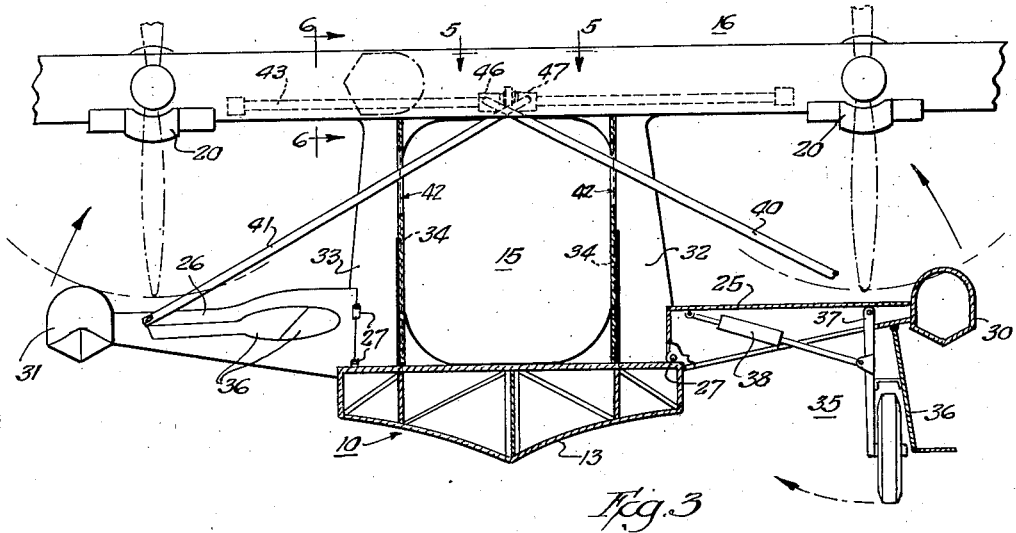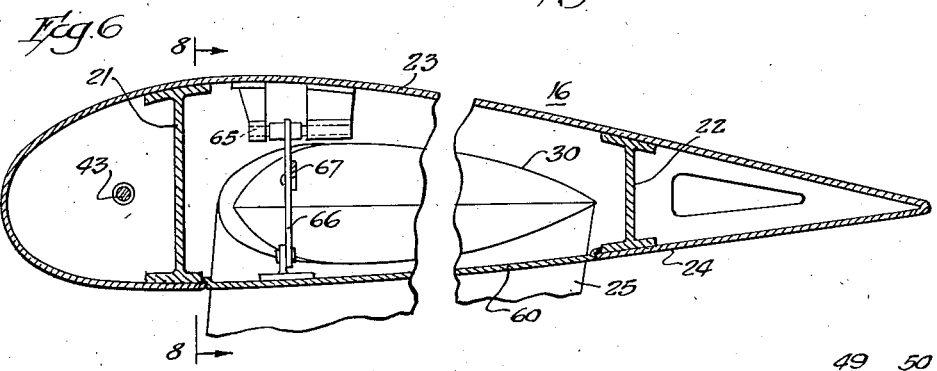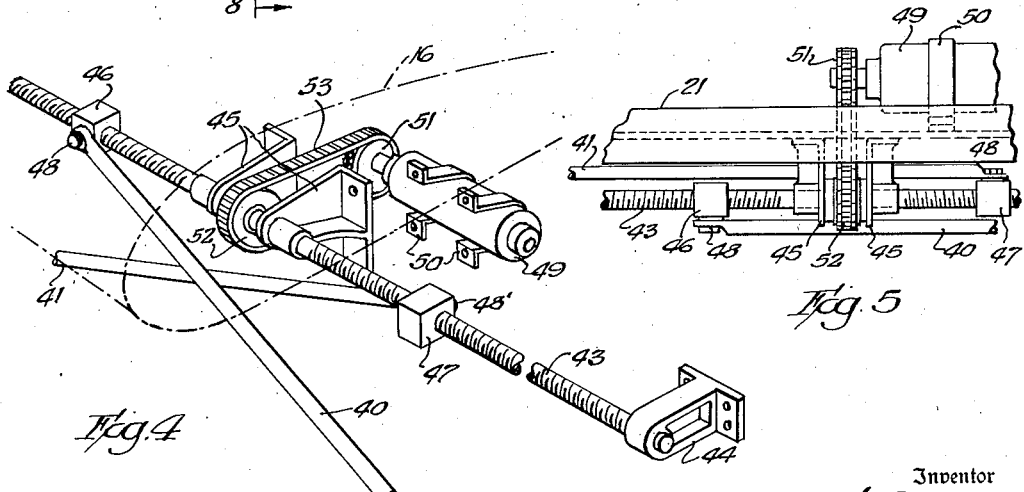

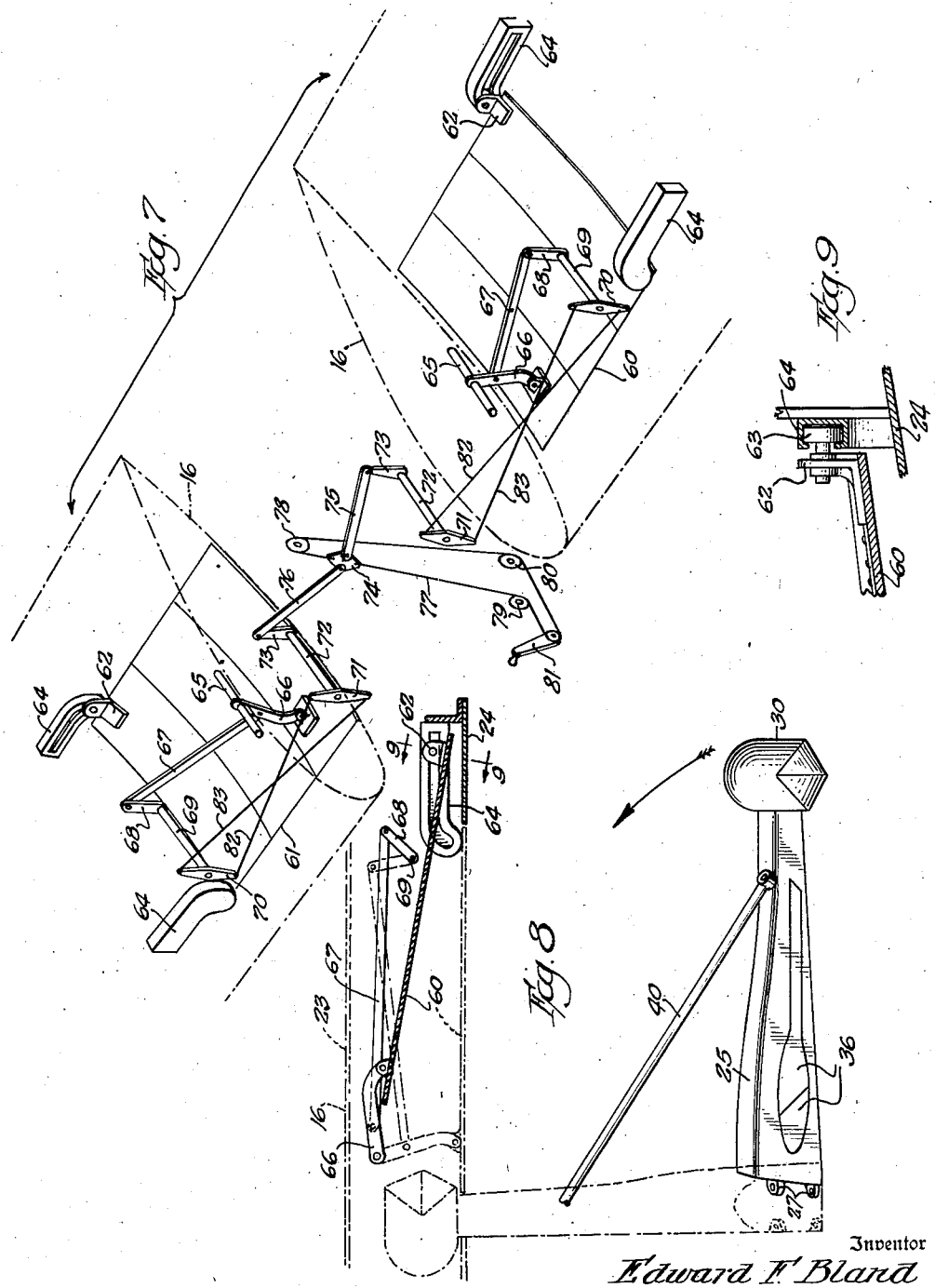

2,431,536

UNITED STATES PATENT OFFICE 2,431,536

AIRCRAFT

Edward Floyd Bland, Seattle, Wash.

Application May 1, 1945, Serial No. 591,305

4 Claims. (Cl. 244—101)

My invention relates to improvements in aircraft and, more particularly, is the provision of wing means for land, sea, and amphibious planes, useful to afford low take-off and landing speeds, but removable from the slip-stream during operational flight.

In aeronautic design it has been a serious difficulty to consolidate in a single aircraft both efficient normal flight characteristics and low-speed take-off and landing characteristics. One widely adopted expedient has been the use of wing-flaps which permit and provide a greater lift for a given speed during take-off or landing and yet can be stowed during flight. However, wing-flaps increase the difficulties to a certain extent, because in the case of wing loading, a rearward shift of the aerodynamic centers of pressure is produced to alter and often destroy efficient longitudinal balance of the craft.

In both civil and military aircraft, it has been found dangerous to lower any lift-flap on a wing at speeds greater than 130 M. P. H. The lowering of the landing gear is limited to speeds of only approximately 140 M. P. H., or 10 M. P. H. faster. The reason that the flaps limit the critical speed for lowering, is mainly due to stresses which are imparted to the main wing structure and also to the flap itself. Because these flaps are invariably located near the trailing edge of the wing, where depth is small, high bending moments are imposed upon the spar of the flap itself between the hinge points. These stresses imparted to the wing caused by lowering the flaps are of the nature of both a torque and drag. The limitation to the lowering of the landing gear to any specific speed is because, when the gear unfolds, graphic stress triangles are more shallow than when the gear is fully extended. This imposes high stresses to subjected members, and oftentimes produces very pronounced vibrations, which can be sufficient to destroy full operation of protraction.

The normal sequence of events of a present day land plane while taking-off is to take-off with the flaps up and to raise the landing gear as soon as possible after take-off. This is the preferred method, as a lowered flap has a far greater percentage of drag than an increase of lift. However, seaplanes employ flaps for take-off in order to permit the lowest take-off speed possible as a means of avoiding some of the wear and tear to the bottom caused by the impact pounding at higher speeds.

In the case of seaplanes, which almost invariably are of high-wing design, wing flaps seriously interfere with operation when the plane has climbed to its hydroplane step, since the necessary lowering at that point of the nose attitude is particularly difficult due to the rearward displacement, caused by the wing flaps with their high drag, of the center of pressure and the consequent tendency of the wing to rise to a stall.

Also, in landing an airplane which has been cruising at 200 M. P. H., the following sequence takes place: the throttles are pulled back (lower engine power) and the airplane tends to settle immediately. To counteract this, the nose is raised enough to counteract any loss in altitude. Meanwhile the speed is falling off. When the speed of 140 M. P. H. is reached, the wheels are lowered. This creates a great drag and power must be applied if altitude is to be maintained (as required oftentimes while on instruments and on a radio range when on airport approach). On final approach to the airport, the power is again slacked off and the nose raised still further, until 130 M. P. H. is reached, and then the flaps are lowered. As the flaps go down, the nose tends to raise, and the airplane must be "dumped over" to a lower angle of attack immediately, in order to stay above stalling angles. At this stage, control is sluggish and requires extreme precision on the part of the pilot.

Another difficulty inherent in seaplanes is the resultant of the necessarily great (by comparison with land planes) frontal area required by the features permitting it to be water-borne, which features produce excessive drag and hence lowered efficiency by the same comparison. It does not appear that the drag of the hull structure can be materially remedied or eliminated, but it is certain that the elimination of all unnecessary drag resulting from the stabilizing floats and their struts can be had, yet the prior art is silent in this respect. Certain seaplanes employ wing-tip floats, notoriously having poor aerodynamic qualities, which are outwardly or downwardly displaceable for use, but which have a portion or all of them exposed to the slip-stream during normal flight, which of course produces undesirable air disturbances and the like.

When the floats are located at the wing-tip, they impart forces to the wing at a most critical point, and to such a degree as to materially interfere with the control of the craft. In the case of suspended wing floats, a torque is often imparted to the wing as the floats drag in the water.

Having in mind these and other defects of the prior art, it is a prime object of this invention to provide in an aircraft of land, sea, or amphibious type, a low take-off and landing speed, without detracting from desirable operating characteristics while the craft is in normal flight.

Another object of the invention is the provision in aircraft of the advantages of the sesqui or sponson type wing for low take-off and landing speeds, but so arranged as to avoid disruption of the normal characteristics of the fuselage and wings during flight.

A further object of my invention is to provide in aircraft a low take-off and landing speed without interference with longitudinal, lateral, or directional control of the craft.

Still another object of this invention resides in the provision of retractable means useful in reducing landing and take-off speeds, which have no deleterious effects upon aerodynamic and static balance of the craft during retraction or protraction.

Other and further objects of my invention are lower wing loading during take-off and landing, while maintaining a higher lift load than during normal flight; to provide means quickly employable for lowering flight speeds without unduly stressing the main wing; to lower take-off and landing speeds without producing problems of increased torque in the main wing; to permit complete stowage of seaplane stabilizing floats; and to provide an arrangement whereby, in an amphibious plane, many of the good points of a land plane, including its high desirable retractable landing gear, can be combined with a sponson type wing common with seaplanes.

The foregoing objects, and others ancillary thereto I prefer to accomplish as follows:

According to a preferred embodiment of my invention, I provide a seaplane fuselage having a high wing and highly placed engines with retractable sponson-type wings on either side, each having a float at the outer end. The sponson type-wings are foldable about a lower axis upon the fuselage into cavities provided therefor, so as to be entirely removed from the slip-stream. The floats at the tips of the sponson-type wings are also stowable entirely out of the slip-stream and preferably within the root cross section of the main wing. Means is provided for protracting and retracting the sponson-type wings, operable from within the aircraft and said means include suitable bracing struts for rigidly positioning the sponson type wing in its protracted position. To facilitate the stowing of the wing-tip floats within the main wing, certain portions thereof are retractable to provide suitable openings for the wing-tip floats and also the sections are returnable to a normal position, contributing to the perfect airfoil section of the main wing, both during protracted and retracted positions of the sponson type wing and its float. In order to permit landing of the plane upon the ground, and to facilitate its removal from the water, as over a ramp, suitable ground engaging gear of the retractable type may be incorporated in the sponson-type wing and in a manner to provide a broad base for support of the craft on the ground.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 1 is a view in side elevation, and

Fig. 2 is a low angle perspective view, of an aircraft embodying my invention;

Fig. 3 is a vertical sectional view taken through a plane with portions shown in elevation or omitted for convenience of illustration;

Fig. 4 is a perspective view, and

Fig. 5 is a plan view, of wing retracting and protracting means employable in my invention, with portions of the aircraft omitted for convenience of illustration;

Fig. 6 is a sectional view through the main wing of the craft, as though taken on line 6—6 of Fig. 3;

Fig. 7 is a schematic view in perspective of means employed in the aircraft main wing for returning certain panel sections thereof to facilitate retraction of the sponson-type wing and of its stabilizing floats;

Fig. 8 is a sectional view taken along line 8—8 of Fig. 6; and

Fig. 9 is a detail sectional view of certain guide means forming part of the main wing panel retracting means of Fig. 7.

In the drawings accompanying this application, I have illustrated my invention, and hereinafter I shall describe the same as though applied to an amphibian capable of landing on sea or land, and of moving from one to the other. It will be obvious, however, to those skilled in the art that this invention is not restricted to that specific form of invention, as without the ground-engaging landing gear, the craft would qualify as a seaplane, and it will also be obvious that the invention can be incorporated in a craft not adapted to land in the water, and still, nevertheless, be fully useful.

In my disclosure, the numeral 10 refers in general to a hull or fuselage of the high-wing monoplane type, with a nose 11 and an empennage 12 comprising the usual group of movable stabilizing planes and control surfaces operable from within the craft. The bottom 13 is here shown as of the hydrofoil type, having the step 14 whereby hydroplaning characteristics are derived for the support of the aircraft while waterborne. Within the fuselage is the cabin 15 adapted to accommodate passengers or freight and control mechanism.

Upon the fuselage is mounted the airfoil or wing 16 having the usual ailerons 17, 17 in the outboard trailing edge of the wing, which ailerons normally function to impress a rolling motion to the plane.

The aircraft illustrated is shown as provided with two propellers 18, 18, mounted in advance of the wings on either side of the fuselage by means of shaft housings 19, 19, and operated in each instance by an engine enclosed within the wing and the engine fairing 20.

The wing 16 comprises the main-wing spar 21, and preferably, a secondary-wing spar 22, disposed substantially parallel to the main-wing spar to the rear thereof, and covered, as can be seen in Fig. 6, by the upper wing surface 23 and the lower wing surface 24.

On either side of the fuselage, below the main wing, is mounted a sesqui or sponson wing 25 on the port side and 26 on the starboard side. The term sesqui-wing is employed, because it has an area that is less than half that of the main wing 16, and the term sponson is also thought appropriate, because the wings 25 and 26 are designed to give lateral stability both while the craft is airborne or water-borne. For convenience of description hereinafter, each wing 25 or 26 will be referred to as a water-wing, since in the seaplane that is its primary function, as well as in the case of the amphibian.

The wings 25 and 26 are hingedly mounted at 27 to the fuselage at a lower point, to swing from a normal upright stowed position within the cavities 32 and 33, respectively, on the port and starboard sides of the fuselage to the horizontal position shown in Figs. 2, 3 and 8. When the craft is being used either as an amphibian or purely as a seaplane, the water-wings 25 and 26 are provided with wing-tip floats 30 and 31, respectively, to assist lateral stabilization while the aircraft is water-borne.

From within the cabin 15, for entrance or exit, doors 34 are let into the inner wall of either or both of the cavities 32 and 33. It will be seen that when the wings are closed upon the sides of the fuselage, as during normal flight, not only will the cavities in each instance be completely filled with wing-structure, but also the doors will be effectively closed and secured against accidental or other opening.

For the purpose of permitting movement of the aircraft upon the ground, as it is brought ashore or landed upon a landing strip, each of the water-wings may be equipped with retractable landing gear 35, suitably mounted within each wing. When in the retracted position, the cavity into which the landing gear is placed is closed by cover plates 36. The gear 35 is mounted to swing about the pivot 37, and to be actuated into such movement by an expansible chamber and linkage assembly, indicated as a whole by the numeral 38.

The mechanism for protracting and retracting the water wings 25 and 26 is preferably mounted within the upper portion of cabin 15 in a central section of the wing 16, and comprises an operating screw 43, having threads on either side of the midportion of opposite lead. Screw 43 is mounted at its end in the outboard bearings 44, and at the midportion, in the amidships bearings 45. On either side of the center section of the screw 43 are mounted for movement the port and starboard nut elements 46, 47, respectively. Extending from the port nut 46 to the port wing 25 is a strut 40, which is coupled to the nut 46 by means of coupling pin 48; likewise between the starboard nut 47 and the starboard wing 26 extends the strut 41 similarly coupled to the starboard nut. In each instance, the struts are pivotally connected, preferably adjacent the leading edge to the water-wings and approximately in line with the pivot axis of the retractable landing gear 35 in each such wing.

Protraction and retraction of the water-wing 25 is obtained by the screw operating mechanism comprising motor 49, preferably mounted by means of clamps 50 to the main spar 21 of wing 16. Upon the drive shaft of the motor 50 is the drive gear 51 in line with a driven gear 52 secured to the screw 43 between bearings 45, 45. An endless sprocket chain 53 encircles gears 51, 52, and passes through a suitable opening in the main spar. It will be seen that when the motor is actuated in either direction to rotate the screw 43, the nuts 46 and 47 will be drawn toward each other or away from each other and, consequently, the water-wings will be either protracted or retracted in accordance with the movements of the nuts and the struts connected therebetween.

For convenience in securing the water-wings in their stowed upright position, and for the further purpose of removing the floats at the ends of the wings from the slip-stream, I have found it most convenient to place the water-wings, during periods of non-use, within the cross-section of the main wing 16. The wings are swung upward about the hinge axis 27 and the floats at the ends describe an arcuate path. In order to have water-wings of a sufficient size to be useful and strong enough, I have found that the length of the wing is best at slightly greater than the dimension from the point of the pivot mounting to the root of the main wing at cabin or fuselage.

To accomplish simple stowage of the floats within the recesses, I employ the slidable hatches 60 and 61 on the port and starboard undersides of wing 16. The outer surfaces of the hatches are complementary to the overall under-surface of the main wing and form part of the skin thereof when in place.

As can best be seen in Figs. 7, 8 and 9, the hatches have near their outboard ends hangers 62 to which are attached cantilevered rollers 63 that are movable within flanged channel members 64, the latter being suitably secured to structral members within the wing, preferably to the main and secondary spars 21, 22. Each of the guide channels 64 has a straight line path toward its outer end, and a downwardly curved path toward its inner end.

Above each hatch, and near its inboard end, is mounted a pivot 65, to the under side of the upper surface of the main wing, and from each pivot depends lever 66, as can best be seen in Fig. 7. Coupled to lever 66, intermediate its ends, is a draw link 67, that is in turn coupled to a crank arm 68 on the suitably journalled crank-shaft 69, which shaft has secured thereto the outboard bell-crank 70. Fuselageward of bell-crank 70 is a similar inboard bell-crank 71, secured to an inboard crank-shaft 72, that is journalled in a conventional manner and which has the crank arm 73.

Since the assembly just described is duplicated on each side of the fuselage, it will be seen that the crank arm in each case is oppositely positioned on either side of the longitudinal median of the fuselage.

Substantially at the median of the aircraft body is a traveler 74, to which are attached the lateral links 75 and 76 to port and starboard thereof, each of which links is coupled with a crank-arm 73. The traveler 74 is moved by cable 77 that is led over pulleys 78, 79 and 80, as schematically shown in Fig. 7, and is caused to move by means of the ratcheted operating crank 81 which may be manually or otherwise turned. When the traveler 74 is caused to ascend, the links 75 and 76 are brought more into alignment to thereby outwardly rock the crank arm 73, to rotate shaft 72, and to swing the bell-crank 71. The bell-cranks 71 are coupled to bell-cranks 70 by crossed cables 82 and 83, and the movement of each bell-crank 71 will thereby be translated into a similar parallel movement of the bell-crank 70. In this manner, shaft 69 is rocked, as also is the arm 68 caused to swing.

In the instance described, draft will be applied to the link 67 and to the lever 66 causing it first to apply outward pressure to the hatches 60 or 61, whichever the case may be, to move the rollers 63 in their respective channels, and then to lift the inboard portion of the hatch clear of the arcuate path of the float, as such is described upon upward and inward swinging motion of the water-wing. In this manner the float will be stowed within the wing, and then when the hatch is dropped back into its normal position in the underside of the wing, the airfoil contour will be re-established and all unnecessary protuberances will have been removed from the slip-stream.

Take-offs are accomplished with slidable hatches 60 and 61 closed or in the protracted position. This keeps the drag at a minimum. As soon as the aircraft is air-borne, sponsons 25 and 26 may be retracted immediately if low-level high-speed flight is of necessity. Otherwise, if higher altitude flight is the prerequisite, the sponsons may be left protracted (with the landing gear 35 retracted) as a higher rate of climb in feet per minute will result from the lower wing loading. A slight change in longitudinal trim will be required when the landing gear is retracted, as in any aircraft. Since any aircraft suffers from high-wing loading at extremely high altitudes where the air is less dense, in this case the water-wings permit a higher absolute ceiling than otherwise would be permissible for the amount of power available.

After the take-off, the pilot should retract the landing gear 35, and continue climbing with sponsons extended until he desires to level off. At such time, he trips the ratchet on crank 81, which permits the hatches to automatically open by means of the upwardly exerted pressure on the underside of the wing. Then, by activating motor 49, he can retract sponsons 25 and 26. Next he turns crank 81 until the hatches are brought to the closed position. The ratchet will hold them in such closed position.

When approaching an airport for landing, while in flight crank 81 is tripped and the enclosure hatches open as before described. This will create slightly more drag, but little loss of lift, as the top of the wing is not perforated. Due to the substantial structure of sponsons 25 and 26, they can be started in protraction by motor 49 at high speeds, there being no critical speeds for lowering the water-wings. The entry of these sponsons into the airstream creates drag without lift while the sponson wing is in the upper part of its path. This in turn initiates a deceleration of the craft. However, no loss of lift occurs as these sponson wings begin to lift a degree during their travel, which lift becomes maximum when the wing is substantially horizontal. By the time the airplane has slowed down, enough lift is created to maintain a constant altitude without resorting to back-throttling as in the case of the airplane with flaps. After the sponsons are fully protracted, the airplane will be sufficiently slowed down to lower the landing gear. There is noticeable lack of throttle movement, and this is valuable in instrument approach, as a man has only about 40% of mental reservation left for manipulating auxiliary controls in the cockpit. Throttles may be pulled off at will to dispose with altitude. The enclosure hatches may or may not be closed while landing. A faster rate of descent will be maintained with them open, however. In landing, the sponson wing creates a compression with the ground or water which checks the rate of descent at the critical time and serves as a good braking force aerodynamically, while coming to rest.

While I have shown and described particular embodiments of my invention, it will occur to those skilled in the art that various changes and modifications may be made without departing from the invention, and I therefore aim in the appended claims to cover all such changes and modifications as fall within the true spirit and scope of my invention.

Having thus described my invention, I claim:

1. In an aircraft: a fuselage including a mainwing and having a recess in each side therebelow, a retractable hatch in the underside of the mainwing adjacent each said recess, means for retracting and protracting said hatches, an airfoil extending outward from each side of said fuselage below the mainwing, each said airfoil being swingably coupled to said fuselage, and means for swinging said airfoils each into a recess and its outboard tip into the mainwing through the opening provided by retraction of the adjacent hatch.

2. In a seaplane: a fuselage including a mainwing and having a recess in each side therebelow, a retractable hatch in the underside of the mainwing adjacent each said recess, means for retracting and protracting said hatches, an airfoil extending outward from each side of said fuselage below the mainwing, each said airfoil being swingably coupled to said fuselage and having at its outboard end a float, and means for swinging said airfoils each into a recess and its float into said mainwing through the opening provided by retraction of the adjacent hatch.

3. In a seaplane: a fuselage including a mainwing and having a recess in each side therebelow, a hatch in the underside of the mainwing adjacent each recess, said hatches being retractable to within said mainwing, means for retracting and protracting said hatches, an airfoil extending outward from each side of said fuselage below the mainwing, each such airfoil being swingably coupled to said fuselage and having at its outboard end a float, and means for swinging said airfoils each into a recess and its float into said mainwing through the opening provided by retraction of the adjacent hatch.

4. In an aircraft: a fuselage including a mainwing, an airfoil extending outward from each side of said fuselage below the mainwing, a retractable hatch in the underside of said mainwing adjacent its root, means for retracting and protracting said hatches, each said airfoil being swingably coupled to said fuselage, a drawstrut coupled to each airfoil and extending to within the fuselage, and means for imparting a draft to said drawstruts for swinging each said airfoil to adjacent the fuselage and for passing the tip thereof through the opening provided by retraction of the hatch above the airfoil and into the mainwing.

EDWARD FLOYD BLAND.

REFERENCES CITED

The following references are of record in the file of this patent:

UNITED STATES PATENTS

| Number | Name | Date |
| --- | --- | --- |
| 1,835,371 | Bellanca | Dec. 8, 1931 |
| 1,958,486 | Medvedeff | May 15, 1934 |
| 1,898,694 | Sikorsky | Feb. 21, 1923 |
| 2,185,235 | Swanson | Jan. 2, 1940 |
| 1,904,281 | Ellingston | Apr. 18, 1933 |
| 2,153,266 | Minshall | Apr. 4, 1939 |

FOREIGN PATENTS

| Number | Country | Date |
| --- | --- | --- |
| 772,353 | France | Apr. 13, 1934 |